United States Patent [19]

Evans et al.

[11] Patent Number: 4,459,523
[45] Date of Patent: Jul. 10, 1984

[54] MOTOR SPEED CONTROL

[75] Inventors: Alfred J. Evans; Melvin L. Harrod; Raymond H. Misner, Jr., all of Raleigh, N.C.

[73] Assignee: Tipper Tie, Inc., Apex, N.C.

[21] Appl. No.: 474,498

[22] Filed: Mar. 11, 1983

[51] Int. Cl.³ .............................................. G05B 5/00
[52] U.S. Cl. ..................................... 318/480; 318/313
[58] Field of Search ................. 318/313, 480; 338/15, 338/17, 19; 250/200

[56] References Cited

U.S. PATENT DOCUMENTS

| 3,659,187 | 4/1972 | Lamorlette | 318/313 X |
| 3,859,617 | 1/1975 | Oka et al. | 338/15 |
| 3,961,177 | 6/1976 | Hatchett | 250/201 |

FOREIGN PATENT DOCUMENTS

| 2920891 | 11/1979 | Fed. Rep. of Germany | 338/15 |
| 921262 | 3/1963 | United Kingdom | 338/15 |
| 2078367 | 1/1982 | United Kingdom | 338/15 |

Primary Examiner—Ulysses Weldon
Attorney, Agent, or Firm—Allegretti, Newitt, Witcoff & McAndrews, Ltd.

[57] ABSTRACT

A motor speed control is disclosed herein. The speed control includes a photoelectric array and a control member situated within a housing. The photoelectric array provides a discreet, regulated voltage in accordance with the position of the control member, and a control circuit sets the motor speed based upon the level of the regulated voltage.

6 Claims, 6 Drawing Figures

MOTOR SPEED CONTROL

BACKGROUND OF THE INVENTION

The present invention relates generally to an electric motor and more particularly to a speed control therefor.

Electric motor speed controls are presently available in a number of forms and formats. A quite simple D.C. motor control includes, essentially, a potentiometer for varying the input motor voltage and thus the speed of the motor.

Another type of speed control includes a linear variable differential transformer ("LVDT"). This transformer is far more complex and far more expensive than the potentiometer-type control.

In an application involving several D.C. motors and several speed controls, and where the motors will run virtually continuously, the commercially available equipment fails to provide a cost-justifiable, effective, and long-lasting speed control. The potentiometer-type controls, which are often available directly from the motor manufacturer, have only a limited life expectancy, and thus the failure rate is high under constant motion conditions. Further, the potentiometer-type controls have a tendency to develop "dead spots", i.e., operational "dead spots" which cause the motor to stop.

Linear voltage differential transformers are simply too expensive for multi-control applications. These "LVDT's" usually have far more capability than is required in the simple, multi-control application, and consequently the per unit cost is often unjustifiable.

SUMMARY OF THE INVENTION

The present invention is a simple, inexpensively manufactured and longlife motor speed control. The speed control includes a housing, a control moveable with respect to the housing, a photoelectric array and a control circuit.

The photoelectric array, secured within the housing, provides a regulated voltage to the control circuit, depending upon and in accordance with the position of the control rod. That is, the regulated voltage varies with the control rod position. The control circuit sets the speed of the motor, in a well-known manner, based upon the level of the regulated voltage.

In a particularly preferred embodiment of the present invention, the photoelectric array includes a series of light-emitting diodes and a corresponding series of phototransistors. The phototransistors receive at least a portion of the light pattern generated by the light-emitting diodes and provide the regulated voltage in accordance with the light portion received.

The control member interposes the diodes and transistors to intercept or block the light pattern. Thus, the position of the control member (with respect to the housing) determines the amount of light passing to the phototransistors, i.e., the control rod position defines a light-blockage ratio.

It is thus an object of the present invention to provide an improved speed control for an electric motor. Another object is a D.C. motor speed control which is inexpensively produced and has a long operational lifetime.

Still another object is a reliable, long-life speed control, whereby operating and maintenance costs of a D.C. motor application are substantially minimized. It is yet another object of the present invention to provide a motor speed control utilizing a photoelectric array for producing a regulated speed-determining voltage.

These and other objects, features and advantages of the present invention are set forth or apparent in the following detailed description.

BRIEF DESCRIPTION OF THE DRAWING

Preferred embodiments of the present invention are described, in detail, with reference to the drawing wherein.

DETAILED DESCRIPTION OF A PREFERRED EMBODIMENT

Figure 1:
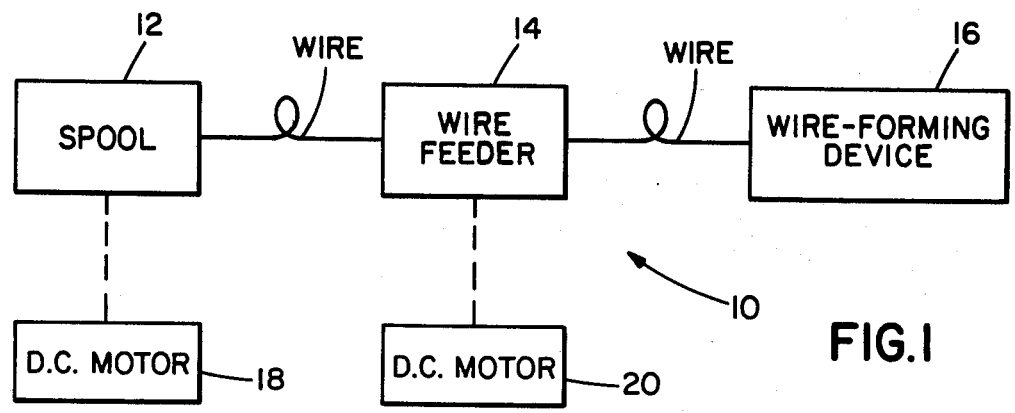
FIG. 1 is a schematic diagram of a multi-motor wire forming system, wherein the present invention is readily utilized.

In FIG. 1, there is shown schematically a wire-forming system 10, wherein wire is fed from a spool 12 to a wire feeder 14 and then to a wire-forming device 16. The spool 12 and wire feeder 14 are each driven by a D.C. motor 18, 20, respectively, and in this system 10, the tension on the wire between the spool 12 and the wire feeder 14 and between the wire feeder 14 and the wire-forming device 16 is to be controlled. The system 10 further operates in a continuous fashion, and the tension is controlled by adjusting the speed of the D.C. motors 18, 20.

Figure 2:
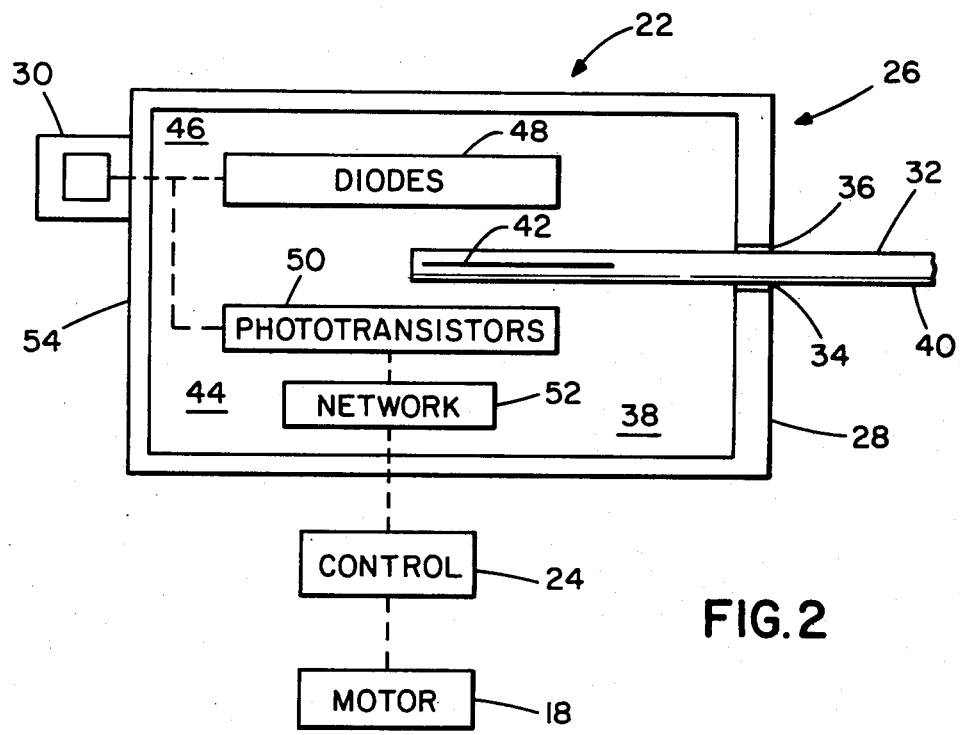
FIG. 2 is a cross-sectional view of a first preferred embodiment the speed control comprising the present invention.
Figure 3:
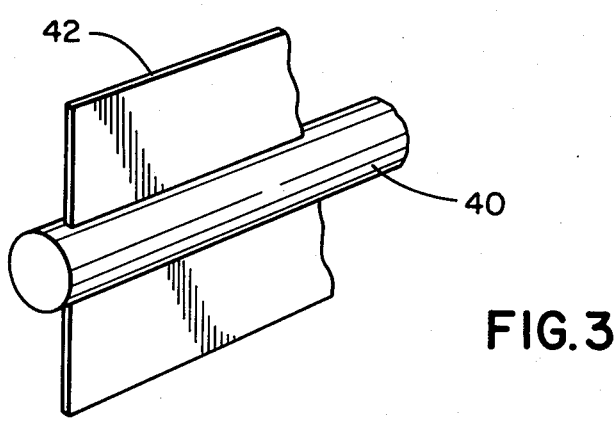
FIG. 3 is a partial perspective view of the control member shown in FIG. 2.

Each D.C. motor 18, 20 is speed controlled by the present invention, shown in FIG. 2 as a motor speed control 22. Referring now to FIGS. 2-3, the motor speed control 22 includes a control mechanism, i.e., control means 24, for setting the speed of the motor 18 in accordance with a regulated voltage. The control means 24 is conventional and receives the regulated voltage from a photoelectric array, shown as photoelectric means 26.

In this preferred embodiment, the speed control 22 includes, in addition to the control means 24 and photoelectric means 26, a housing 28, a voltage supply 30, and a control member 32. As shown, the housing 28 receives the control member 32 through an opening 34 such that the control member 32 is moveable with respect to the housing 28.

In this preferred embodiment, the housing 28 and the control member 32 are preferably coaxial for ease of fabrication and assembly. In addition, the opening 34 is fitted with a bushing 36 such that the chamber 38 defined by the housing 28 is substantially light-tight. As shown in FIG. 3, the control member 32 includes a control rod 40, which extends beyond the housing 28 through the opening 34, and a substantially non-transparent flag 42 affixed to the control rod 40 within the housing 28. The flag 42 extends the breadth of the chamber 38 so as to define two half-chambers 44, 46, respectively.

The photoelectric means 26 is secured within the housing 28. The photoelectric means 26 includes a linearly-arranged series of light-emitting diodes, shown schematically at 48, within the half-chamber 46, a corresponding, correlated series of phototransistors, shown schematically at 50, in the other half-chamber 44, and a resistance network, shown schematically at 52. As such, the control rod 40 and flag 42 interpose the diode series 46 and phototransistor series 48.

Figure 6:
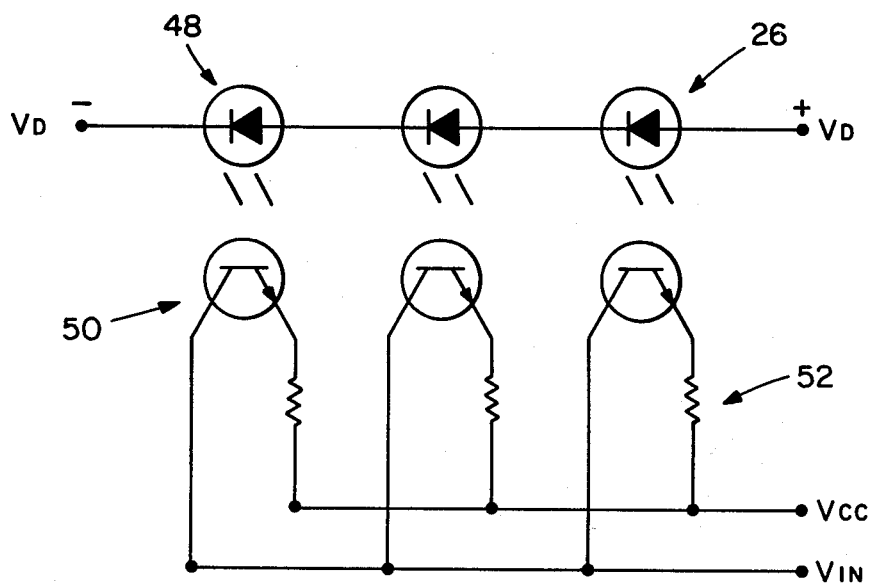
FIG. 6 is a partial electrical schematic of the photoelectric array utilized in the preferred embodiments of FIGS. 2 and 4.

In this preferred embodiment of the present invention, the photoelectric means 26 includes a twelve-element array of diodes, phototransistors, and resistors, as partially shown schematically in FIG. 6. This twelve-element array is available from Texas Instruments Incorporated (Dallas, Tex.) under the designation "TIC 136". The photoelectric means 26 is interconnected to and powered in a conventional manner by the voltage supply 30 ($V$IN). The voltage supply 30 is secured to the outward end wall 54 of the housing 28. As shown in FIG. 6, the resistance network 52 includes discreet resistors, interconnected to the phototransistor series 50 so as to provide a regulated voltage ($V$CC) at one of twelve possible levels.

Operationally, the light-emitting diodes 48 emit a light pattern, directed towards the phototransistors 50. The amount of light received is determined by the position of the control member 32 with respect to the housing 28. As the control member 32 is withdrawn from the housing 28 (by movement from left to right in FIG. 2), a greater portion of the light pattern is received by the phototransistors 50 and the light-blockage ratio decreases. The flag 42 is dimensioned and positioned so as to provide a light-blockage ratio between zero (0) and one-hundred (100) percent.

In response to the light from the diodes 48, the phototransistors 50, in cooperation with the resistance network 52, provide the regulated voltage to the control means 24. The level of the regulated voltage is determined by the amount of received light and is thus dependent upon the light-blockage ratio. As such, the photoelectric means 26 provides the regulated voltage in accordance with the position of the control member 32.

As indicated, the regulated voltage will be one of twelve discreet voltage levels in this preferred embodiment, correlated to the twelve element array. The control means 24 receives the regulated voltage and, in response to the level thereof, sets the motor speed. Positioning of the control member 32, and thus setting of the motor speed, can be accomplished manually or automatically.

Figure 4:
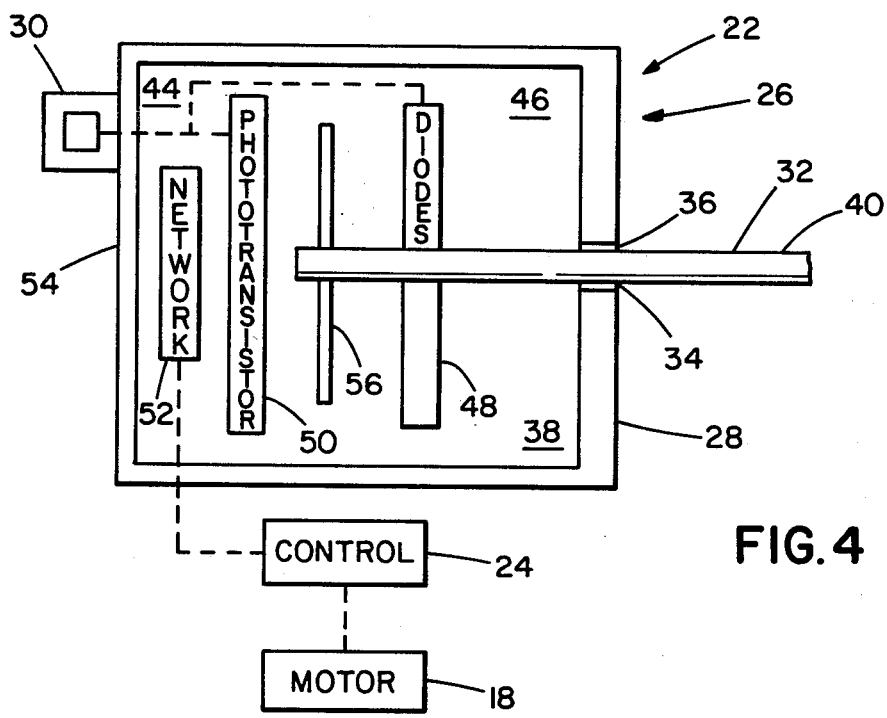
FIG. 4 shows, in cross-section, a second preferred embodiment.
Figure 5:
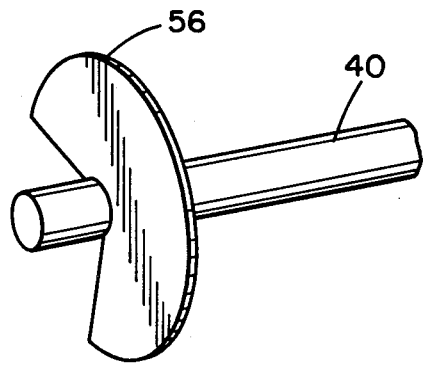
FIG. 5 is a partial perspective view of the control member shown in FIG. 4.

Referring now to FIGS. 4 and 5, a second preferred embodiment is shown. (Reference numerals for identical components are carried over from FIGS. 2 and 3.) Herein, the structural components vary slightly, although operationally the two preferred embodiments are virtually identical.

In this embodiment, the control member 32 is adapted to rotate with respect to the housing 28. The substantially non-transparent flag 36 is replaced by a substantially non-transparent disc 56, affixed to the control rod 34 within the housing 28. The disc 56 interposes the diode series 48 and phototransistor series 50: however, the diode series 48 is now circularly-arranged, as is the corresponding phototransistor series 50.

Two preferred embodiments of the present invention have been described. It is to be understood, however, that modifications and changes can be made without departing from the true scope and spirit of the present invention, which are defined by the following claims.

What is claimed is:

1. A speed control for a motor, operable at a speed within a speed range, comprising, in combination:
   a housing;
   a control member adapted to move with respect to said housing, said control member including a substantially non-transparent flag;
   a voltage source;
   photoelectric means, within said housing and interconnected to said voltage source, for providing a regulated voltage in accordance with the position of said control member, said photoelectric means including a series of light-emitting diodes connected to said voltage source and a series of corresponding phototransistors, said light-emitting diodes providing a continuous light pattern to control the conductive state of said corresponding phototransistors, said substantially non-transparent flag being between said light-emitting diodes and said corresponding phototransistors so as to controllably interrupt said continuous light pattern, said regulated voltage being a series of discreet voltage levels in accordance with the conductive state of said series of corresponding phototransistors; and
   control means, interconnecting said motor and said photoelectric means, for setting said speed of said motor in accordance with said regulated voltage.

2. A speed control as claimed in claim 1 wherein said variable voltage means further includes a resistance network interconnected to said series of corresponding phototransistors.

3. A speed control as claimed in claim 1 wherein said control member is slideable within said housing.

4. A speed control as claimed in claim 3 wherein said control member includes a control rod extending beyond said housing, said substantially non-transparent flag being secured to said control rod within said housing.

5. A speed control as claimed in claim 1 wherein said control member rotates with respect to said housing.

6. A speed control as claimed in claim 5 wherein said control member includes a rotatable control rod extending beyond said housing, said substantially non-transparent flag being substantially disc-shaped and affixed to said control rod within said housing.

* * * * *